Feb. 27, 1934.  G. W. O'KEEFE  1,948,947
FILTERING APPARATUS AND PROCESS
Filed Nov. 8, 1929  2 Sheets-Sheet 2
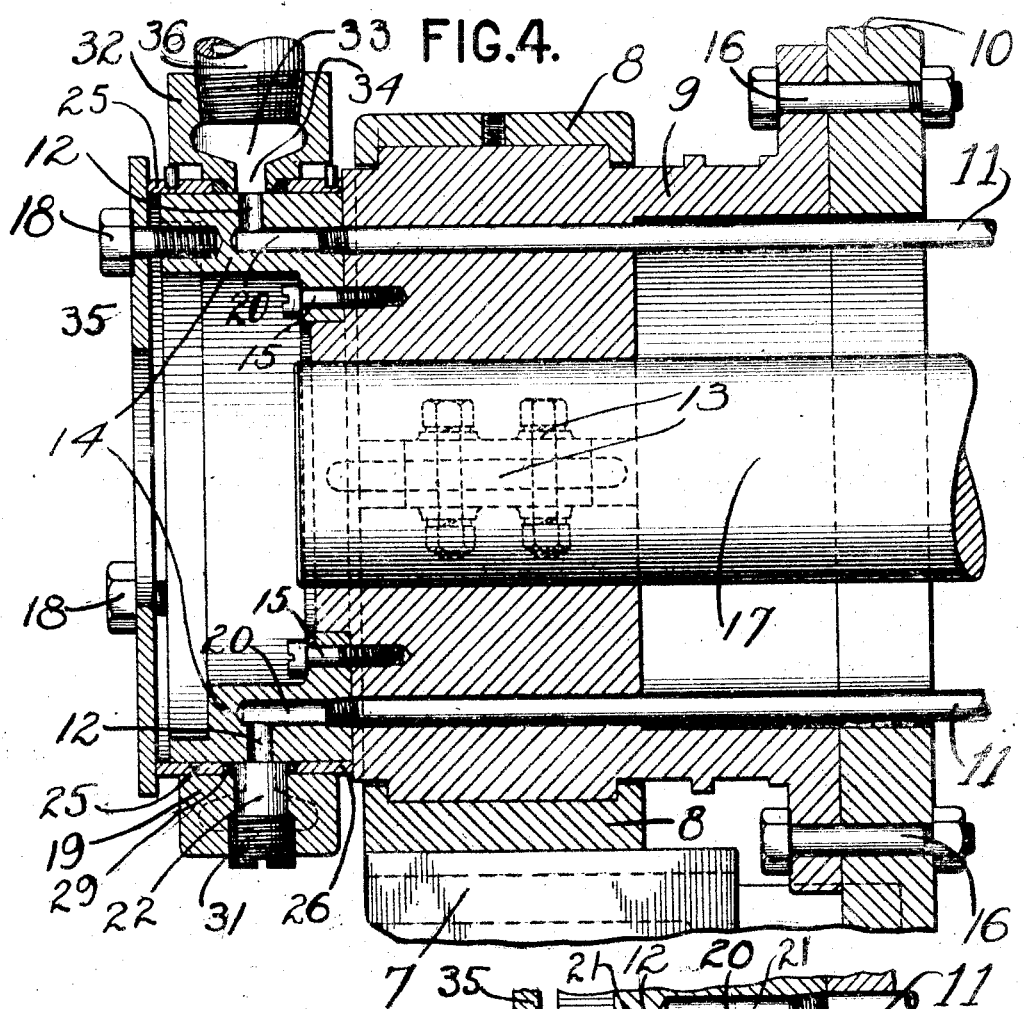
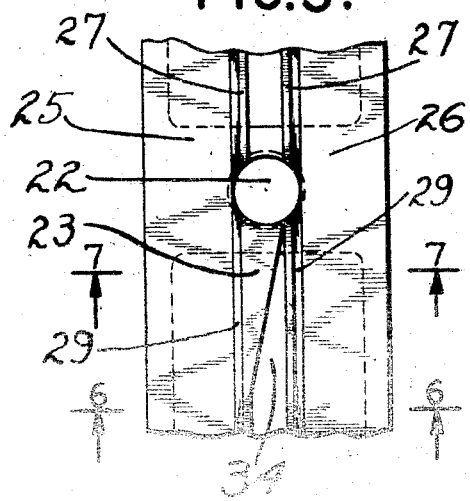
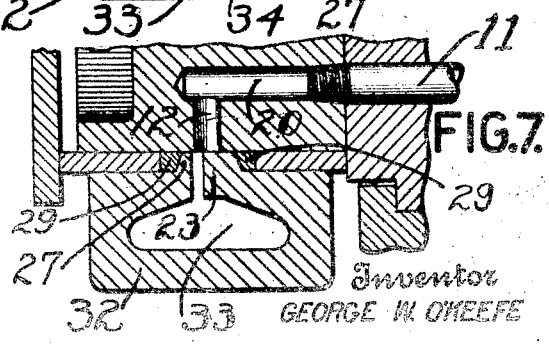
Inventor
GEORGE W. O'KEEFE Patented Feb. 27, 1934

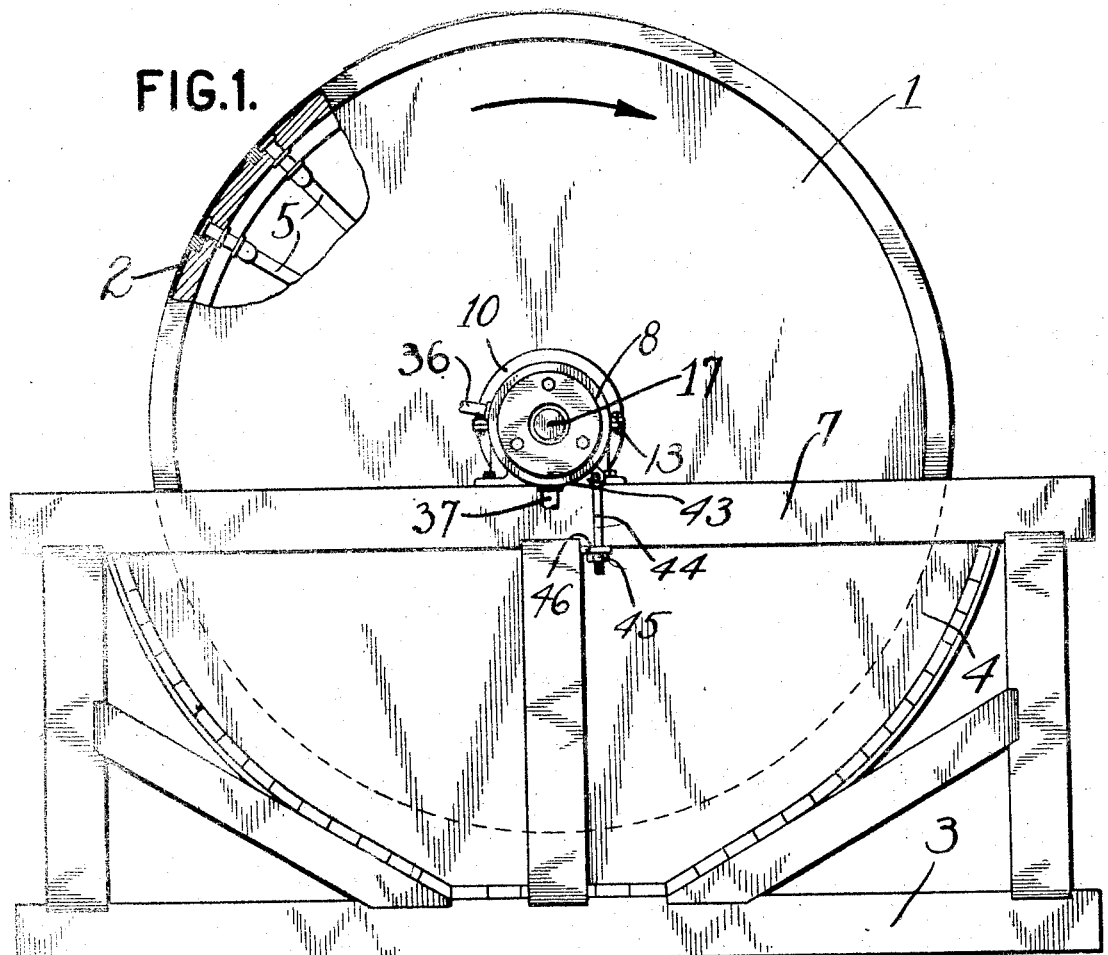
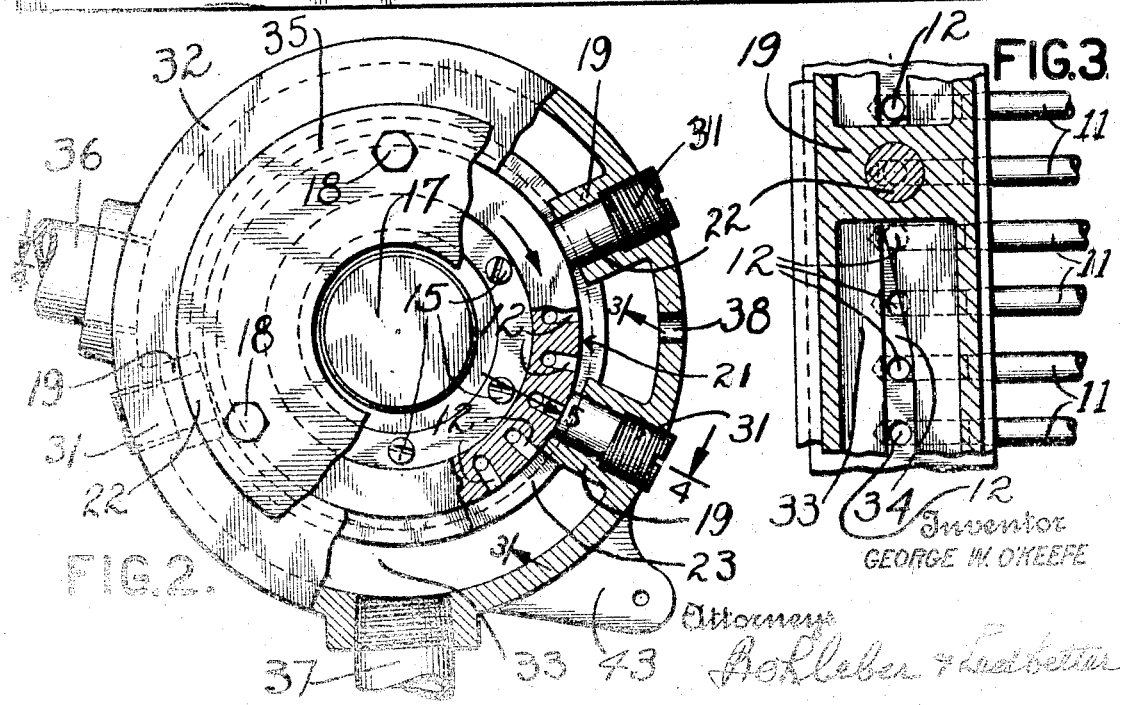

1,948,947

UNITED STATES PATENT OFFICE 1,948,947

FILTERING APPARATUS AND PROCESS

George W. O'Keefe, New Rochelle, N. Y., assignor to Filtration Engineers, Inc., Newark, N. J., a corporation of New Jersey Application November 8, 1929. Serial No. 405,601

13 Claims. (Cl. 210—202)

This invention relates to rotary vacuum filters and to a process of continuous filtration. Such a filter may comprise a drum adapted to rotate about its longitudinal axis and be partly submerged in the material to be filtered. The curved surface of the drum may be provided with suitable filtering material and the drum may be provided with trunnions. The drum may be divided internally and longitudinally into segments. Pipes may lead from each segment through a trunnion and be adapted to deliver into a suitable collecting valve.

As described in the copending application Serial No. 242,499 of Wright & Young, filed December 24, 1927, the collecting valve may be formed of a rotary core in which are located radial ports communicating with pipes which lead to the above described segments and to the filtering surface of the drum, the said rotary core acting in conjunction with a collecting means comprising a hollow annular collar adapted to be fixed in a stationary position and adapted to receive fluids such as liquids or air, delivered from the surface of the filter through the said pipes and ports and into an annular channel in the said annular collar.

The annular channel may be divided into compartments in which different degrees of subatmospheric pressure may be applied or corresponding to and adapted to receive respectively, filtrate and wash water or fractions thereof. The channel may also contain a compartment into which air is permitted to enter to destroy the vacuum or reduced pressure applied to the filtering surface and to thereby assist in releasing the filter cake from the filtering surface. This air compartment or vacuum releasing compartment may be located adjacent to the filtrate compartment and may correspond to the last stage of the filtration cycle.

As described in the application Serial No. 242,- 499 of Wright & Young herein above referred to, the annular collecting channel may be divided as shown therein into three compartments; one for filtrate, one for wash water and the third compartment for the admission of air and for the destruction of the vacuum to assist in the release of the filter cake from the surface of the drum.

By rotating the drum, trunnions and valve core, different sections or segments of the filtering surface are brought into communication with the respective compartment in the hollow annular collar. This communication is effected through the radially disposed ports in the valve core, each of which ports passes successively through each of the said collecting compartments.

As described in the said application Serial No. 242,499, the compartments may be separated by partition members that contain radially adjustable sealing elements which bear upon and are in close sliding contact with the rotating valve core and which may be made of a non-metallic material such as lignum vitæ to form an efficient sealing and nonfriction surface.

As the filtering surface of the drum which may rotate in a clock-wise direction, dips into the slurry or material to be filtered, contained in a suitable tank, the radial ports in the valve core leading to the submerged portion of the drum surface come into communication with the filtrate compartment of the annular collecting means to which reduced pressure is applied by means of a suitable pump. As the filtering surface of the drum emerges from the said tank, the radially disposed ports move progressively into communication with the second or wash water compartment of the annular collecting means, and are thereby adapted to deliver wash water received from the emerged surface of the drum into the said wash water compartment of the annular collecting means. As the rotation of the drum and valve core continues to the third or last phase of the filtering cycle, the radial ports in the valve core pass from communication with the wash water compartment into communication with the vacuum releasing compartment, into which air may be freely admitted under normal or super-atmospheric pressure and are thereby adapted to deliver such air to the filtering surface of the drum prior to its reentrance into the material to be filtered, to equalize the pressure upon the inside and outside of the filtering surface and to thereby enable the filter cake to be readily removed from the surface of the drum.

As the filtering surface of the drum enters or reenters the slurry, or material to be filtered, the radial ports in the valve core pass suddenly from a zone of atmospheric pressure to one of reduced pressure and the said ports are thereby immediately opened to the suction or reduced pressure compartment. This sudden change of pressure tends to cause a rush of solids to the filtering surface which in some cases at least, causes a portion of such solids to penetrate and pass through the filtering surface and to thereby cause a turbid filtrate. Furthermore, the sudden change in pressure described has a tendency to cause plugging or stoppage of the filtering surface.

The present invention provides all the advantages set forth in application Serial No. 242,499.

It furthermore provides an improved filter apparatus and an improved filtering process whereby with certain materials which are filterable with difficulty a perfectly clear filtrate may be obtained; that is, a substantially complete and very efficient separation of solid from liquid material.

It provides also an improved process and apparatus whereby clogging of the filtering surface may be obviated.

The invention provides an improved apparatus and process controllable by the operator so that each port, as it passes from communication with one compartment into communication with the next compartment, particularly as the said port passes from communication with the vacuum releasing compartment into communication with the filtrate compartment, may be gradually opened or exposed to the compartment into communication with which the said port moves in its rotation. As a result of these provisions, the several portions of the filtering surface may be gradually subjected, at the will of the operator, to a variable or gradually reduced pressure as, for example, from atmospheric pressure down to any desired degree of vacuum readily obtainable with evacuating pumps.

In addition to the advantages and provisions recited above, the invention includes such further advantages and provisions as are herein described, shown or claimed.

The invention will be described in greater detail with reference to the accompanying drawings which illustrate a preferred embodiment of the apparatus of the invention adapted for the practice of the process of the invention. It is intended and will be understood that the invention is illustrated by, but not limited to such illustration and description.

In the accompanying drawings which form a part of the specification, Figure 1 is an end elevational view of a rotary filter, partly broken away, showing the filtering drum together with one of the trunnions, bearing for the same and collecting valve, the whole being mounted upon a frame work. The drum is shown as dipping into a tank containing material to be filtered.

Figure 2 is an enlarged end view of the collecting valve showing some parts in section and others in elevation.

Figure 3 is an enlarged detail view partly in section and partly in plan taken on the line 3—3 of Figure 2 showing portions of the annular collecting channel, radial ports in communication therewith and means adapted to permit the said radial ports to be gradually opened to the said collecting channel.

Figure 4 is a sectional view of the end plate of the filter drum, one of the trunnions, a bearing for the same, and the collecting valve showing the annular hollow collecting ring or collar, containing an annular collecting channel communicating with radially disposed ports in the rotary core of the collecting valve.

Figure 5 is an enlarged detail view looking in the direction of the arrow 5 in Figure 2 and showing in plan the radially extending flanges of the annular collecting ring or collar, the radially adjustable sealing element or plug and the means adapted to gradually expose the radial ports of the valve core to the said compartments.

Figure 6 is a section on the line 6—6 of Figure 5, and Figure 7 is a section on the line 7—7 of Figure 5.

Like parts in the several figures are designated by like numerals.

The drum 1 of a rotary filter is provided with end plates 10, which plates are secured by bolts 16 as shown in Figure 4, to hollow trunnions 9, carried in trunnion bearings 8. The bearings 8 are supported upon the horizontal member 7 of the supporting frame 3. The bearings 8 are of the split type, 13 representing the bolts and flanges which connect the two halves of the bearing. The drum 1 is provided with a shaft 17, supported in the trunnions 9, and rotatably connected to a motor or other suitable actuating device not shown. Both ends of the drum are provided with trunnions and bearings for the same. As shown in the drawings only one such trunnion is provided with a collecting valve. As shown in Figure 1, the drum 1 is provided with, and is adapted to, dip into a suitable tank 4 for containing material such as slurry to be filtered.

Radially disposed pipes 5, shown in Figure 1, are in communication with the filtering surface 2, which is formed of suitable permeable or filtering material. The said pipes 5 communicate with corresponding and axially disposed pipes 11 as shown, for example, in Figures 3, 4, 6 and 7. The said pipes 11, pass through the hollow trunnion 9, and are connected with corresponding nipples 20 axially disposed in the collecting valve core 14. The latter is joined with the hollow trunnion 9 by bolts 15. The said nipples 20 communicate with radially disposed ports 12 which in turn communicate with the annular slot or groove 34 of the annular collecting channel 33, or cored annular space contained in the collecting ring or collar 32.

Referring now more especially to Figures 2, 3, 4 and 5, the collecting means or collar 32 contains division members 19 which divide the annular collecting space into three compartments, viz; a filtering compartment provided with the port 37, a wash water compartment provided with the port 36, and a vacuum releasing compartment provided with the air port 38.

The annular collar 32 is provided with radially extending flanges 27, which operate in slideable contact with the outer surface 21 of the valve core 14.

To provide more effective sealing means between the several compartments, sealing elements or plugs 22 are provided in the division members 19, and are adapted to operate in close sliding contact with the surface 21 of the valve core 14. The ends of these sealing elements in contact with the core surface are slightly concave to conform to the convexity of the core periphery and are preferably made of a non-metallic substance, as for example, lignum vitæ, which will form an improved sealing element. The sealing element therefore provides non-metallic supporting means for the collecting ring. The said sealing elements are radially adjustable by means of the screws 31. The diameter of the sealing elements 22 is greater than the width of the annular channel 34.

To provide an improved seal between the annular collecting means 33 and the outside atmosphere, annular packing means 29 is provided on either side of the radially extending flanges 27 of the annular collecting ring 32. The said packing is adapted to be forced into sealing contact with the outer surface of the valve core and of the radially extending flanges 27 through the agency of packing rings 25 and 26, which in addition to the said function enclose the valve core 14 and rotate with it in sliding contact with the annular collecting ring 32. The packing therefore provides non-metallic suppporting means for the collecting ring in addition to the sealing element. The packing rings are adapted to be adjusted by means of the face plate 35, which in turn is adapted to be adjusted by the screws 18.

Referring more especially to Figures 1, 2 and 4, the collecting means 32 is carried on the valve core 14 and packing rings 25 and 26 as shown. In order to secure the said collecting means in a suitable position, adjustable securing means is provided. This comprises the lug 43, the rod or link 44 pivotally secured to and adjustable thereon and provided with a threaded end upon which the nut 45 is adapted to operate in conjunction with a flange 46, the said flange being secured as shown to the filter frame.

Referring now more particularly to Figures 2, 3, 5, 6 and 7, immediately beyond the division member 19 which separates the vacuum releasing compartment from the filtrate compartment and located in the latter, there is a graduated restriction of the annular channel 34 by means of a choking device or tapered member 23, this tapered member or choking device 23 being more particularly shown in Figures 2, 3, 5 and 7.

The tapered member referred to may be, as shown, an extension of the lower portion of a partition or division member such as 19, and may be designed as shown in the form of a wedge with the broad end thereof terminating in a division member as more particularly shown in Figure 5. The side view of said wedge is indicated in Figure 2 by the reference numeral 23, and as therein shown has the same degree of curvature as that of the valve core 14 with which the wedge 23 co-acts. There is, preferably, between the wedge 23 and the valve core 14 a working clearance, to the extent for example of about 1/64 of an inch. The pitch of the wedge or the angle which the sloping portion thereof makes with the sides of the groove 34, may be varied as conditions warrant to provide a very long narrow wedge with a small pitch or a shorter wedge with a large or steep pitch.

In the operation of the apparatus, the ports 37 and 36 are respectively connected with suitable suction means for the withdrawal of filtrate and wash water respectively, and the filter drum with its attached trunnion 9 and valve core 14 is rotated at a suitable speed which may be varied by suitable variable speed means not shown. As the radial ports 12 (see, for example, Figures 2 and 3) pass into communication with the compartment equipped with air supply port 38, air is admitted to the corresponding segments and surface of the filter drum just prior to the submergence thereof in the material to be filtered, to enable the filter cake to be readily removed from the surface of the drum.

The radial ports then progressively pass the partition member 19 and plug 22 and come into co-action with the tapered member or wedge 23. As the opening of each port continues in its circumferential path, it is not suddenly exposed to the action of the reduced pressure conditions in the filtrate collecting compartment, but on the contrary the area of the opening of each of the ports 12 become gradually exposed to vacuum through co-action of said openings with the tapered constriction means or wedge 23. The effect is somewhat similar to that obtained if each of the radial ports 12 had therein a valve adapted to be gradually opened as each port passed into communication with the filtrate compartment. By the means described, reduced pressure is gradually communicated through the radial ports 12 in communication with the filtrate compartment through the corresponding nipples 20, axial pipes 11 and radial pipes 5 to the filtering surface as it submerges in the tank 4; and by this means the movement of solids to the surface of the filtering material may be controlled so as to be gradual, as contrasted with the sudden rush of solids which would take place if the application of the vacuum were not suitably graded as described. With certain materials it is difficult, if not impossible, to obtain a clear filtrate in the absence of such a control and gradually applied reduced pressure at the surface of the filter drum.

With a wedge having a given taper or pitch, the rapidity of movement of solids toward the filtering surface can be varied by varying the speed of rotation of the drum and valve core, and by varying the extent of the vacuum applied.

It is desirable that the taper of the wedge, the speed of rotation and the degree of vacuum be suitably coordinated to provide the proper degree of velocity of solids toward the filtering surface. In particular, the operator can control the speed of rotation so that the movement of the radial ports 12 past the wedge 23 is just the right magnitude to provide a suitably graded application of vacuum, and to obtain filtrate of the desired degree of clarity. This can be done by testing or observing the filtrate and coordinating the speed of rotation with the applied vacuum. If the filtrate runs through turbid, the speed of rotation and/or degree of vacuum can be reduced so that the movement of solids toward the filtering surface is reduced to the point where such solids are, for the most part, retained upon the said filtering surface, as shown by greater clarity of the filtrate.

In addition to providing improved means for obtaining a better separation of solids and liquids, the present invention provides, furthermore, an improved means for lengthening the life of the filter cloth, or other medium, by the gradual application of vacuum against the filter cloth. The usual tendency of the particles to be forced into and plug up the filter cloth is greatly reduced or eliminated.

The invention, in addition to providing an improved apparatus, provides furthermore an improved process whereby the speed of rotation may be varied and coordinated with the degree of vacuum applied to adapt the apparatus and process to different conditions such as different concentrations of the same material and different materials. With materials which tend to plug up the filter cloth to a marked extent or which tend, owing to their particle size or other properties, to pass through the filter cloth and cause turbidity in the filtrate, the speed of rotation of the valve core can be reduced and, if necessary, coordinated with a reduction of vacuum so that the said material will approach the filtering surface at such a relatively low speed that it will be retained upon the said surface.

In the preferred form of the invention as shown, the device employed to assist in securing a gradually applied vacuum is a graduated constriction in the groove 34 which forms a part of the annular collecting means 33.

Other means may be employed in accordance with the teachings of the present invention which describes broadly the method of gradually applying reduced pressure to the interior surface of a rotary filter. Such other means not shown herein may comprise a conical valve, for each radial port, co-acting with a radial valve stem and suitable cam means so that each valve may be gradually opened as the corresponding radial port moves into communication with the filtrate compartment.

The present invention sets forth an improved filtering process and apparatus and teaches that by avoiding sudden impact of material to be filtered against the filtering surface and substituting therefor a very gentle and controlled velocity of solids toward the filtering surface and a very gentle impact of said solids with the filtering surface that marked improvement may be attained, including improved clarity of filtrate and increased effective life of the filtering surface.

The advantages of the invention have been set forth in some detail and the preferred embodiment has been described. It is to be understood, however, that various changes may be made in the operation as described and in the form and arrangement of the apparatus without departing from the invention or sacrificing any of the advantages enumerated, or any other advantageous results which may be obtained by an application of the principles set forth.

What is claimed is:

1. In a continuous rotating filter, means adapted to gradually increase the difference in pressure between the exterior and interior surfaces of the said filter comprising ports connected with the filter surface, and at least one collecting channel having at least a portion thereof extending angularly with respect to and across the path of movement of the ports from a point where the port is closed to gradually increase the port openings.

2. A collecting valve, comprising in combination a rotary valve core, ports disposed therein, collecting means adapted to be connected with the said ports, and means extending angularly with respect to and across the path of movement of the ports from a point where the port is closed thereby gradually opening the said ports to the collecting means.

3. A collecting valve, comprising in combination a rotary valve core, ports disposed therein, collecting means adapted to be connected with the said ports, division members in the said collecting means, the said division members, being adapted to divide the collecting means into separate compartments and the said division members comprising means extending angularly with respect to and across the path of movement of the ports from a point where the port is closed thereby gradually opening the said ports to the said collecting means.

4. A collecting valve, comprising in combination a rotary valve core, ports disposed therein, collecting means adapted to withdraw fluid from the said ports, and tapered means extending angularly with respect to and across the path of movement of the ports from a point where the port is closed thereby gradually opening the said ports to the collecting means.

5. A collecting valve, comprising in combination a rotary valve core, ports disposed therein, annular collecting means adapted to be connected with the said ports, a division member in the said annular collecting means, said division member having an extension that is tapered circumferentially and extending angularly with respect to and across the path of movement of the ports from a point where the port is closed thereby gradually opening the port openings to the said collecting means.

6. A collecting valve, comprising in combination a rotary valve core, ports disposed therein, an annular collar containing an annular space adapted to be connected with the said ports, a division member dividing the said annular space into separate compartments and having a tapered portion extending angularly with respect to and across the path of movement of the ports from a point where the port is closed thereby gradually opening the said ports to the said compartments.

7. A collecting valve, comprising in combination a rotary valve core, ports disposed therein, collecting means adapted to be connected with the said ports, a division member dividing the collecting means into compartments, and tapered means extending angularly with respect to and across the path of movement of the ports from a point where the port is closed thereby gradually opening the said ports to the said compartments.

8. A collecting valve, comprising in combination a rotary valve core, ports disposed radially therein, an annular collar containing a cored annular space adapted to be connected with the said ports, a transverse division member dividing the said annular space into compartments, and a tapered member extending angularly with respect to and across the path of movement of the ports from a point where the port is closed thereby gradually opening the same to the said compartments.

9. A collecting valve, comprising in combination a rotary valve core, ports disposed therein, an annular collar containing an annular space adapted to collect fluid from the said ports, a transverse division member dividing the said annular space into compartments, a tapered member coacting with the said ports and being adapted to gradually open the same to the said compartments, and an adjustable sealing member coacting with the said division member and with the rotary core to provide efficient sealing between the said compartments.

10. A collecting valve, comprising in combination a rotary valve core, ports disposed therein, an annular collar containing a cored annular space adapted to collect fluid from the said ports, a transverse division member dividing the said annular space into compartments, a tapered member coacting with the said ports and being adapted to gradually open the same to the said compartments, and a radially extending sealing plug coacting with the said division member and with the rotary core, to provide efficient sealing between the said compartments.

11. A collecting valve, comprising in combination a rotary valve core, ports disposed radially therein, a collar in sliding contact with the said rotary core and comprising an annular channel registering with the said ports, the said channel containing a graduated restriction, and the said ports being thereby adapted by rotation to be gradually opened and exposed to the said channel 12. A rotary filter, comprising in combination a drum divided into segments and provided with a filtering surface and trunnions, pipes leading from the segments and axially disposed in a trunnion, continuations of the said pipes constituting ports radially disposed in a rotary valve core, a rigidly adjustable hollow annular collecting ring comprising an annular channel, adapted to receive fluid from the said ports, means to apply vacuum to the said channel and means adapted to gradually open the said ports to the said channel and thereby to gradually apply a reduced pressure to the filtering surface of the said drum.

13. A collecting valve comprising, in combination a valve core, ports disposed therein radially, an annular collar carried with the core and containing an annular space adapted to collect fluid from said ports, spaced non-metallic means to support the collar from the core, and a tapered member coacting with said ports and adapted to gradually open the ports to the annular space.

GEORGE W. O'KEEFE.